June 16, 1959     T. E. FIDDLER     2,890,545
LEG EQUALIZERS FOR APPLIANCES AND THE LIKE
Filed May 11, 1956
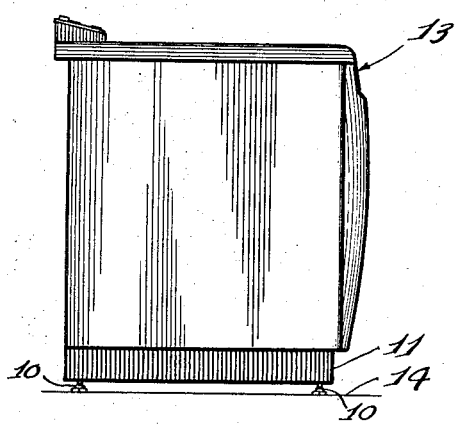
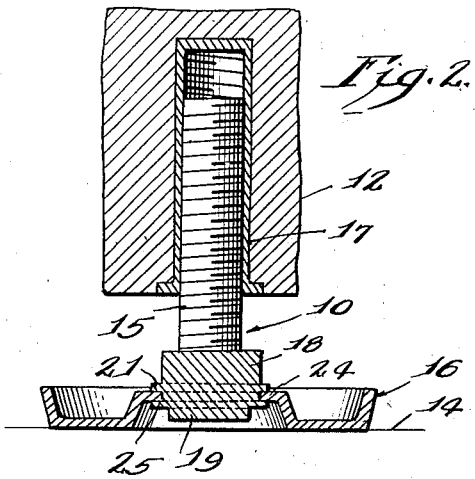
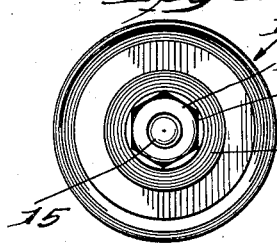
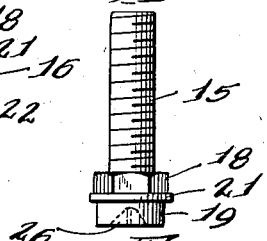
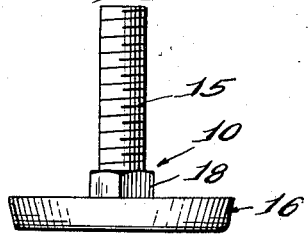
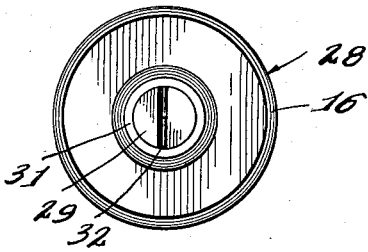
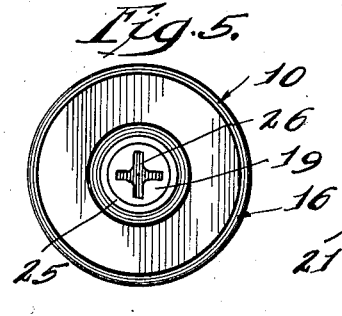
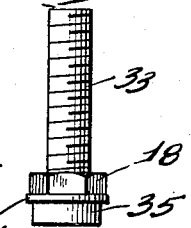
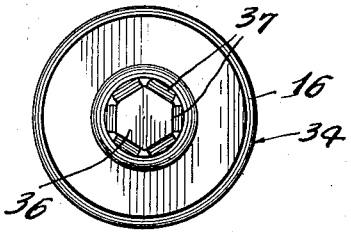
Inventor:
Theodore E. Fiddler,
By Wilson & Geppert
Attorneys.

United States Patent Office 2,890,545
Patented June 16, 1959

2,890,545

LEG EQUALIZERS FOR APPLIANCES AND THE LIKE

Theodore E. Fiddler, Louisville, Ky., assignor to National Lock Co., Rockford, Ill., a corporation of Delaware Application May 11, 1956, Serial No. 584,274

1 Claim. (Cl. 45—139)

The present invention relates to novel adjustable leg equalizers for attachment to the legs or base of an appliance whereby to support said appliance in level position.

Among the objects of the present invention is the provision of a novel adjustable leg equalizer having means on the under part of the equalizer for applying the same to the legs or base of an appliance by a power driver and thereby facilitating their assembly.

Another important object of the present invention is the provision of a novel leg equalizer for an appliance comprising a threaded stem and a base or glide anchored to the stem in rigid assembly and provided with means for assembling the leg equalizer by a power driver and other means for adjusting the assembled leg equalizer whereby to level the appliance upon installation.

A further object of the present invention is the provision of a novel leg equalizer for the legs or base of appliances including a threaded stem adjustably mounted in a leg and provided with a supporting base or glide anchored to the lower end of the stem, said stem having a head below the base or glide to receive a power driver for assembling the leg equalizer upon a leg or base of the appliance, and a part above the base or glide and readily accessible for adjusting the leg equalizer to level the appliance in position for operation.

By this novel construction and assembly, the appliance manufacturer can readily and easily assemble the leg equalizers upon the appliance and thereafter the party installing the same in operative position in the home or other place of use, can readily adjust the previously mounted equalizers to level the appliance in place upon the floor or supporting surface at the ultimate location.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a view in side elevation of an appliance upon the base or legs of which have been assembled the novel leg equalizers of the present invention.

Fig. 2 is an enlarged fragmentary view in vertical cross section through one of the leg equalizers of the present invention and showing the manner of adjustably mounting it in a leg.

Fig. 3 is a top plan view of one of the leg equalizers.

Fig. 4 is a side elevational view of the leg equalizer of Fig. 3.

Fig. 5 is a bottom plan view of the leg equalizer of Fig. 3.

Fig. 6 is a view in side elevation of the threaded stem or spindle of the leg equalizer before the cupped base or glide has been anchored thereto.

Fig. 7 is a view in vertical cross section through the base or glide of the leg equalizer prior to its attachment to the threaded stem of Fig. 6.

Fig. 8 is a view in side elevation of an alternate form of threaded stem and head.

Fig. 9 is a bottom plan view of the assembled leg equalizer embodying the threaded stem and head of Fig. 8.

Fig. 10 is a view in side elevation of another modified form of threaded stem and head.

Fig. 11 is a bottom plan view of the assembled leg equalizer embodying the threaded stem and head of Fig. 10.

Referring more particularly to the drawing and to the novel illustrative embodiments of the leg equalizers disclosed therein, Figs. 1 to 7, inclusive, disclose one form of leg equalizer 10 adapted to be mounted in and depend from the base 11 or a leg 12 of an appliance 13 for adjustably supporting the latter upon the floor or other supporting surface 14.

As it frequently happens that the floor or supporting surface 14 upon which the appliance 13 is to be located is not level, and as an appliance, such as a washing machine, dryer, refrigerator, stove and the like, is intended to be mounted and operated in a substantially level plane or horizontal position for most efficient operation, the present invention comprehends a novel leg equalizer assembly 10 capable of being readily attached to each leg 12 or corner of the base 11 of such an appliance by the use of a power driver, and when the appliance is being installed all or any required number of the assembled equalizers 10 may be readily and easily manipulated to adjust the height of each leg or corner of the base relative to the floor and accurately level the appliance at the desired or required position for most efficient operation.

Each leg equalizer 10 comprises a threaded stem or spindle 15 and a cupped base or glide 16 adapted to rest upon the floor or supporting surface 14 at a desired location and thereat support the appliance at the desired elevation and level position and facilitate moving the appliance to and from its intended location. This threaded stem or spindle 15 is adjustably mounted in an internally threaded socket 17 embedded or anchored in the base 11 or leg 12 of the appliance.

The threaded stem or spindle 15 is provided with an enlargement at one end including a part 18 of polygonal or hexagon shape to receive a wrench or suitable tool for ultimate or final adjustment when the appliance is being installed or moved to its intended location, a circular head 19 at its outer end and an external or annular flange 21 disposed therebetween. The cupped base or glide 16 for assembly upon the enlargement of the stem or spindle 15 is provided with an elevated central portion 22 (Figs. 2 and 7) having an opening 23 for conformably receiving the round or cylindrical head 19 of the stem. With the head 19 inserted and projecting through the opening 23 in the manner shown in Fig. 2, and the flange 21 abutting the lip 24 encompassing and defining this opening, a Phillips flat head punch is then employed to clinch and anchor the base or glide 16 upon the enlargement and against the flange or abutment 21 by shearing, distorting or embossing the metal of the head 19 to form an anchoring flange 25.

The head 19 is shown provided with a Phillips recess or crossed slots 26 to receive a power driver for threading the stem or spindle 15 of the leg equalizer 10 into the socket 17. This recess 26 may be formed or provided in the head 19 during the stem processing operation, or by employing a Phillips flat head punch this recess may be formed in the head simultaneously with the clinching operation.

Figs. 8 and 9 disclose an alternate embodiment of a threaded stem or spindle 27 for a leg equalizer 28 in which the round or cylindrical head 29 thereof is anchored to the base or glide 16 by merely shearing a round diameter to provide an annular anchoring flange 31 and during the processing or forming of the stem this head is provided with a transverse slot 32 for receiving a conventional screw driver. In other respects the stem or spindle for the base or glide is similar to the disclosure in Figs. 1 to 7, inclusive, and similar reference characters have been applied thereto.

In Figs. 10 and 11 a further modification of a threaded stem or spindle 33 is provided for a leg equalizer 34. In this form, the circular head 35 (Fig. 10) is clinched to the base or glide 16 by forming the head of a hexagon or polygonal shape as at 36 (Fig. 11) during the clinching operation in which the sheared metal from the head forms the anchoring projections 37. This head of hexagon or polygonal shape is adapted to receive a socket type tool having a recess corresponding to the external shape of the formed head. The cupped base or glide 16 and the remainder of the stem or spindle are similar to the embodiment in Figs. 1 to 7, inclusive, and similar reference characters have been applied thereto.

From the above description and the disclosure in the drawing, it will be evident that these leg equalizers can be readily and easily assembled or applied to each leg or corner of the base of an appliance by a power driver applied to the head at the under part of the base or glide 16, and when the appliance is delivered and ready to be installed the hexagonal-shaped part above the base of these leg equalizers may be readily adjusted by a wrench or other suitable tool to level the appliance in the desired location.

Having thus disclosed the invention, I claim:

An adjustable leg equalizer for the legs or other base of an appliance such as refrigerator, washing machine, dryer, stove and the like adapted to be installed in a desired level position for efficient operation, comprising a threaded shank adjustably mounted at its upper end in the base of the appliance and provided with an enlargement on its lower end having a head, an external flange and a polygonal part intermediate said shank and said flange, said polygonal part being rigidly affixed to said shank for threading or unthreading the latter in the base of the appliance, a glide member for contact with the floor and provided with a central elevated part having an opening through which said head extends and a recess therebelow into which said head projects, means on said head for rigidly anchoring said glide member on said head and against said flange, said head having means for connection to a power driver for threading the shank into the socket during assembly and said polygonal part providing means for adjustment of said equalizer upon the base after assembly and accessible from below the base.

References Cited in the file of this patent
UNITED STATES PATENTS

| | | |
|---|---|---|
| 1,903,688 | Schacht | Apr. 11, 1933 |
| 2,010,299 | Gray | Aug. 6, 1935 |
| 2,024,728 | Galson | Dec. 17, 1935 |
| 2,135,945 | Miller | Nov. 8, 1939 |
| 2,254,973 | Nalle | Sept. 2, 1941 |
| 2,327,050 | Kotler | Aug. 17, 1943 |
| 2,403,338 | Butler | July 2, 1946 |